United States Patent
McLaughlin

(10) Patent No.: US 10,344,897 B2
(45) Date of Patent: Jul. 9, 2019

(54) PIPE COUPLING SYSTEM AND METHOD

(71) Applicant: Varco I/P, Inc., Houston, TX (US)

(72) Inventor: Thomas Kilpatrick McLaughlin, Aberdeenshire (GB)

(73) Assignee: Varco I/P, Inc., Houston, TX (US)

( * ) Notice: Subject to any disclaimer, the term of this patent is extended or adjusted under 35 U.S.C. 154(b) by 71 days.

(21) Appl. No.: 15/617,932

(22) Filed: Jun. 8, 2017

(65) Prior Publication Data

US 2017/0276268 A1    Sep. 28, 2017

Related U.S. Application Data

(63) Continuation of application No. 12/756,389, filed on Apr. 8, 2010, now abandoned, which is a continuation of application No. 11/540,939, filed on Sep. 29, 2006, now Pat. No. 7,731,246.

(51) Int. Cl.
*F16L 15/08* (2006.01)

(52) U.S. Cl.
CPC .................................. *F16L 15/08* (2013.01)

(58) Field of Classification Search
CPC ........ F16L 15/003; F16L 15/008; F16L 15/08
USPC ....... 285/333, 334, 351, 355, 369, 370, 371, 285/383; 277/338, 605, 607, 608, 618, 277/619, 620, 624, 647, 651, 915
See application file for complete search history.

(56) References Cited

U.S. PATENT DOCUMENTS

| | | | | |
|---|---|---|---|---|
| 1,889,868 A * | 12/1932 | Montgomery | ........ | E21B 17/042 285/333 |
| 1,889,869 A * | 12/1932 | Montgomery | ........ | E21B 17/042 285/355 |
| 4,537,406 A * | 8/1985 | Hirasuna | ............... | F16L 15/008 285/334 |
| 6,811,187 B2 * | 11/2004 | Otten | .................... | F16L 15/001 285/333 |
| 7,303,194 B2 * | 12/2007 | Smith, III | ............ | F16J 15/0887 277/647 |
| 7,575,256 B2 * | 8/2009 | Smith, III | ............... | F16L 33/16 285/374 |
| 7,731,246 B2 * | 6/2010 | McLaughlin | ........... | F16L 15/08 285/333 |
| 2008/0073905 A1 * | 3/2008 | McLaughlin | ........... | F16L 15/08 285/55 |

* cited by examiner

*Primary Examiner* — David Bochna
(74) *Attorney, Agent, or Firm* — Conley Rose, P.C.

(57) ABSTRACT

A tubular coupling system and method; the system and method in at least certain aspects, using a coupling member with an interior protective ring that has at least one inner energizing member which, upon compression, forces the body of the coupling member against an interior wall of the coupling thereby inhibiting corrosive material from contacting the coupling's interior wall or, in the event some corrosive material does enter this area, holding the interior protective ring against the coupling's interior wall so that the corrosive material remains in and does not exit this area, thus inhibiting or preventing a continuous flow of corrosive material.

9 Claims, 6 Drawing Sheets

PIPE COUPLING SYSTEM AND METHOD

CROSS REFERENCE TO RELATED APPLICATION

This application is a continuation of U.S. non-provisional application Ser. No. 12/756,389, filed on Apr. 8, 2010, and entitled "Pipe Coupling System and Method," now abandoned, which is a continuation of U.S. non-provisional application Ser. No. 11/540,939, filed Sep. 29, 2006, and entitled "Pipe Coupling System," now U.S. Pat. No. 7,731,246, issued on Jun. 8, 2010, all of which are incorporated herein by reference in their entirety.

BACKGROUND OF THE INVENTION

1. Field of the Invention

The present invention is directed to tubular coupling structures; protection rings for such structures; in one particular aspect, to combinations of a pipe coupling, a protective interior ring, and two pieces of pipe coupled together by the coupling; and to corrosion-resistant threaded connection parts and assemblies for use with clad or lined tubulars, e.g., but not limited to, oil and gas well tubing and casing, piping in chemical and other plants, oil and gas pipelines, and the like.

2. Background of the Related Art

Many tubulars are used to convey corrosive or erosive materials. Many piping systems and pipelines transport fluids that are highly corrosive to the carbon steel used in the pipe. In the drilling for and the production and injection of oil and gas, corrosion-resistant alloy pipe, e.g., casing or tubing, is now used in the drilling of oil and gas wells into zones that produce highly corrosive fluids. To overcome corrosion problems, and as well known to those skilled in the art, it is common to use lined steel pipe, with liners made of plastic, stainless steel, or other corrosion-resistant materials.

Certain typical multiple-walled pipe, e.g., a lined steel pipe, is a dual or double-walled pipe in which the inner wall is a liner tube made of a corrosion-resistant material that serves as a conductor for the corrosive fluid, and an outer wall or pipe that is designed to provide strength to withstand the internal pressures of the corrosive fluid, as well as external forces such as external pressure, mechanical loading, etc. In certain tubulars, there are limitations on the length of such double-walled pipes due to conditions to which the pipes are subjected on site. Thus, in the case of tubing or casing strings and in the production of oil and gas, each joint of pipe is usually about 24-44 feet long while the tubing or casing string itself may be thousands of feet long. Accordingly, and as is well known in making up such tubing or casing strings, successive joints of tubing/casing are connected together using couplings until the desired length of string is achieved. Similarly in pipelines successive pieces of pipe are joined by couplings.

It is desirable, where successive joints of the lined or clad pipe are joined to one another by means of a coupling that the interior of the coupling is protected from corrosion. Many prior art coupling and seal systems attempt an effective coupling structure e.g., and not by way of limitation, as disclosed in the subject matter of U.S. Pat. Nos. 590,811; 1,909,075; 2,040,786; 2,233,734; 2,805,872; 4,679,831; 5,282,652; 5,470,111; 5,689,871; 6,312,024; 6,863,313; and U.S. application Ser. No. 10/513,213 filed May 5, 2003, all of which patents are incorporated fully herein for all purposes.

SUMMARY OF THE INVENTION

The present invention discloses, in certain embodiments, a ring for use in a coupling member, the coupling member having a coupling body with an interior wall, the coupling body being generally cylindrical and having a channel therethrough, the coupling body with two spaced-apart ends, each end threaded for threaded mating with a tubular so that the coupling member is connectible to two tubulars, the ring having: a ring body positionable adjacent an interior wall of a coupling body of a coupling member between the two spaced-apart ends of the coupling body and located for contact by two tubulars coupled together by the coupling member; the ring body being generally cylindrical and having a ring channel therethrough; the ring body having a volume; and at least one energizing member within the ring.

The present invention discloses, in certain embodiments, a ring for use in a coupling member for coupling together two tubulars, the coupling member with a coupling body, the coupling body being generally cylindrical and having a channel therethrough, the coupling body with two spaced-apart ends, each end threaded for threaded mating with a tubular so that the coupling member is connectible to two tubulars, the coupling body having an interior wall, the ring having: a ring body positionable adjacent an interior wall of a coupling body of a coupling member between the two spaced-apart ends of the coupling body and located for contact by an end of each of two tubulars; the ring body being generally cylindrical and having a ring channel therethrough; the ring body having a circumference; the ring body having a volume; and at least one concave area on a surface of the ring.

The present invention discloses, in certain embodiments, a tubular coupling system with a coupling member and an interior protective ring that has at least one inner energizing member which, upon compression, forces the body of the coupling member against the interior wall of the coupling thereby inhibiting corrosive material from contacting the coupling's interior wall or, in the event some corrosive material does enter this area, the interior protective ring is held against the coupling's interior wall so that the corrosive material, once present, may not exit this area, thus preventing a continuous flow of corrosive material into and out of this area.

In certain aspects, such a protective ring has two or more energizing members; and in one particular aspect such a ring has three spaced-apart energizing members located in recesses adjacent openings in the ring that provide for controlled compression of the ring and holding of the ring in position with respect to the coupling's interior wall. In another aspect there are five energizing members, two positioned in the ring adjacent an inner wall of a coupling member and three positioned in an inner wall of the ring.

Any protective ring according to the present invention may have one, two, three, four, five or more concave areas on the ring, on the ring's exterior and/or on the ring's interior to enhance directed controlled energizing of the ring into contact with a coupling member. In one particular aspect, such a ring has three concave portions on the ring's exterior and two concave portions on the ring's interior. Optionally, such a ring (with one-five or more concave areas) may have one-five or more energizing members. In certain aspects, in a ring with two (or more) spaced-apart concave areas on a side of a ring, an energizing member is located between two concave areas.

Accordingly, the present invention includes features and advantages which are believed to enable it to advance coupling technology. Characteristics and advantages of the present invention described above and additional features and benefits will be readily apparent to those skilled in the art upon consideration of the following detailed description of preferred embodiments and referring to the accompanying drawings.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful, unique, efficient, non-obvious coupling systems for tubulars that convey corrosive or erosive material;.

Such systems and methods that employ an inner protective ring with one or more energizing members which, upon compression, assist in holding the ring in place; and Such systems and methods that use such a ring that has edges trapped between a coupling member and an end of a tubular to assist in maintaining a desired location of the ring.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

Figure 1A:
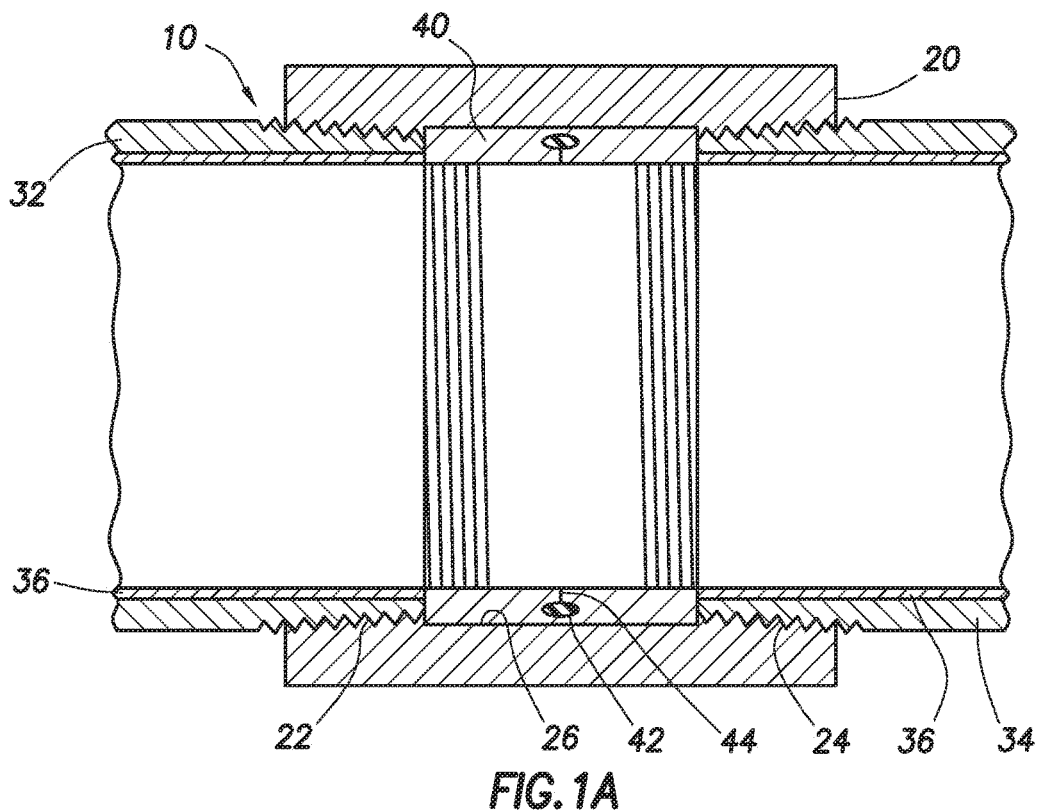
FIG. 1A is a side cross-section view of a coupling system according to the present invention.

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference.

DETAILED DESCRIPTION OF THE INVENTION

Figure 1B:
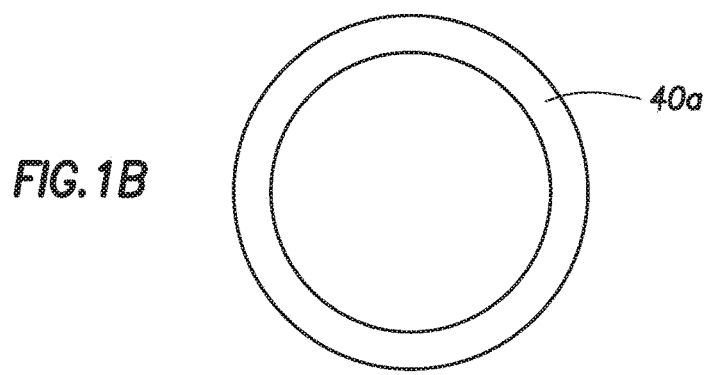
FIG. 1B is a top view of part of the system of FIG. 1A.
Figure 1C:
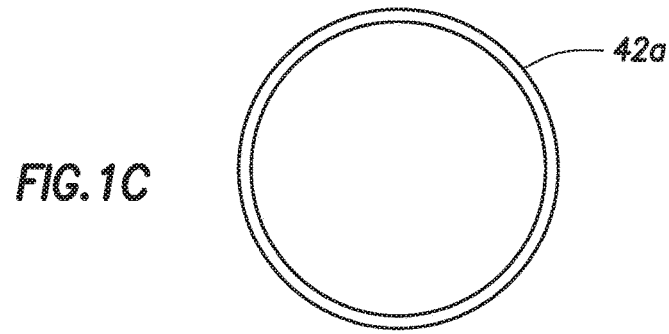
FIG. 1C is a top view of part of the system of FIG. 1A.
Figure 2A:
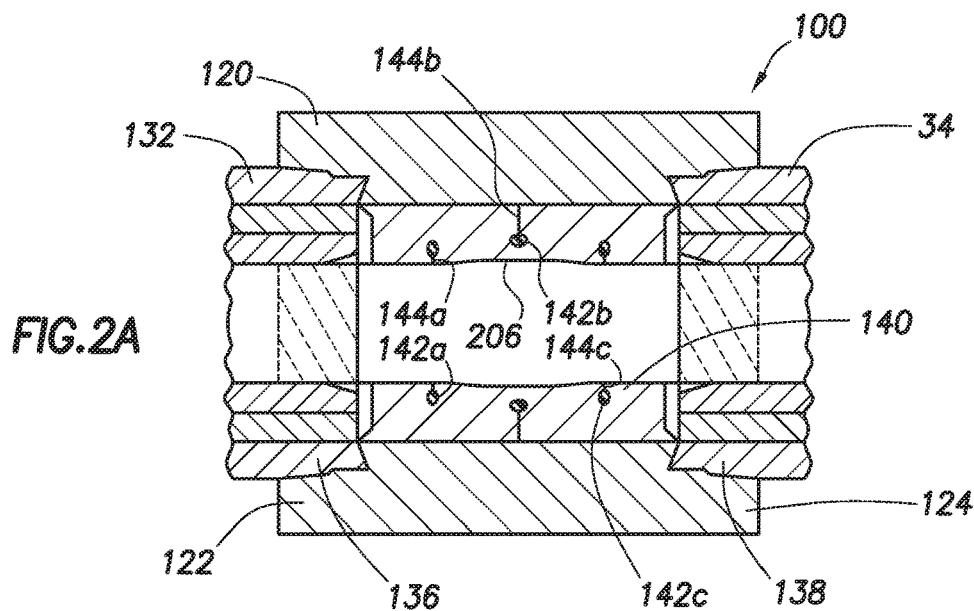
FIG. 2A is a side cross-section view of a coupling system according to the present invention.
Figure 2B:
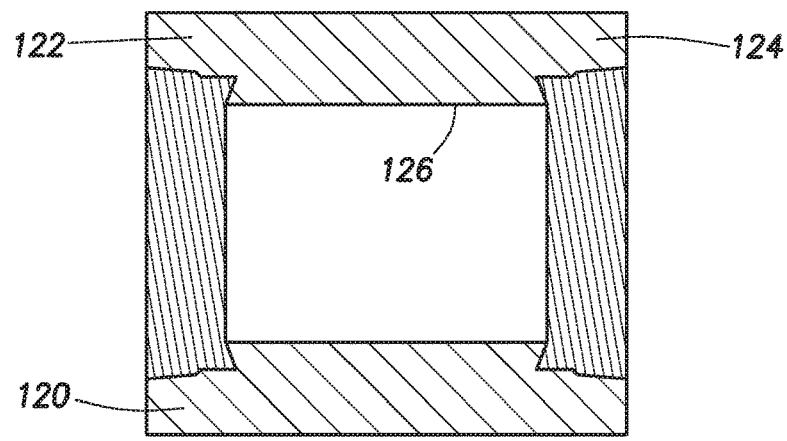
FIG. 2B is a side view in cross-section of part of the system of FIG. 2A.
Figure 2C:
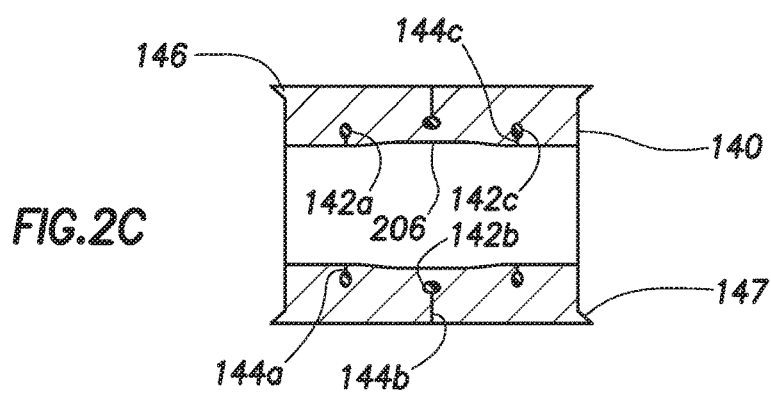
FIG. 2C is a side view in cross-section of part of the system of FIG. 2A.
Figure 2D:
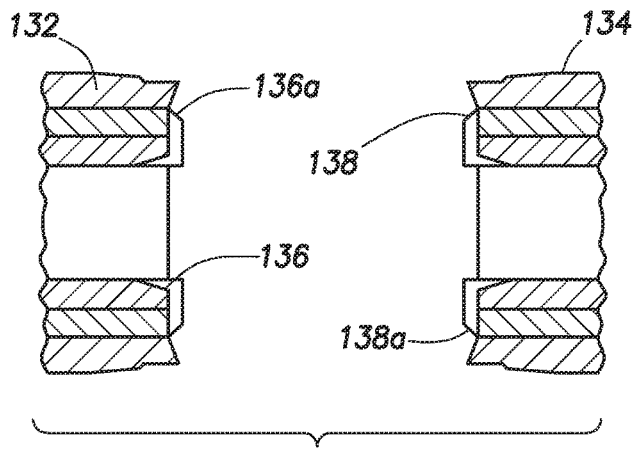
FIG. 2D is a side view in cross-section of part of the system of FIG. 2A.
Figure 2E:
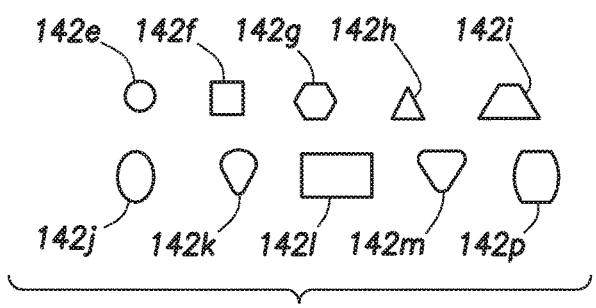
FIG. 2E presents a cross-section view of various energizing members according to the present invention.
Figure 3A:
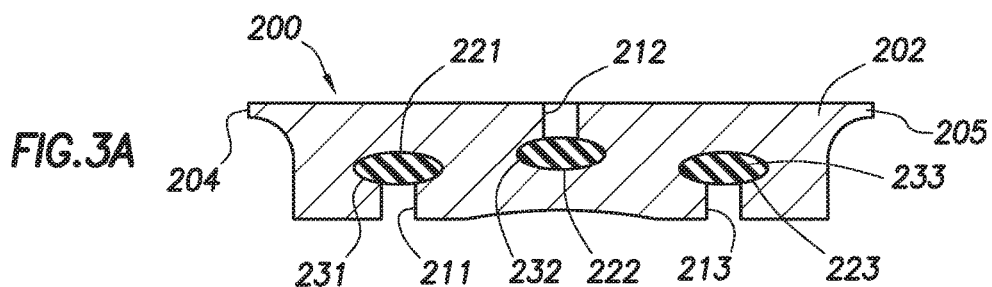
FIG. 3A is a partial side view in cross-section of a protective ring according to the present invention.

As shown in FIG. 1A, a coupling system 10 according to the present invention has a coupling member 20 which is a generally cylindrical hollow member with interiorly threaded spaced-apart ends 22, 24 and an interior wall 26. Two tubulars 32, 34 are threadedly connected to respective ends 22, 24 of the coupling member. Between ends of the two tubulars 32, 34 and adjacent the interior wall 26 of the coupling member 20 is a ring 40 (shown schematically) which is any ring according to the present invention. Optionally the tubulars 32, 34 have a liner 36 which may be any known tubular liner. Optionally, the ring 40 has one, two, three, four, five or more (one shown) energizing member 42. Optionally, a recess, slit, or opening 44 (or recesses or openings) (all referred to as "openings") leads from an exterior of the ring 40 to the energizing member(s) 42 which allow movement (e.g. axial movement of the ring) when compressive forces are applied to the ring without a change in volume of the ring but with controlled change in shape of the ring. FIG. 1B is a top (or bottom) view of one embodiments 40a of a ring 40. FIG. 1C is a top (or bottom) view of one embodiment 42a of a ring 42. The rings and energizing members of FIGS. 2A, 2E and 3A are, similarly, items which are generally circular.

As shown in FIGS. 2A-2D, a coupling system 100 according to the present invention has a protective ring 140 according to the present invention held in compression between the pin ends 136, 138 of the pipes 132, 134. Each pin end 136, 138 is threadedly secured in a respective end 122, 124 of a coupling member 120. The protective ring 140 has three spaced-apart openings 144a, 144b, and 144c, each of which extends interiorly from an exterior of the ring 140 and extends to an interior space which contains an energizing member 142a, 142b, 142c, respectively. Any energizing member in any embodiment of the present invention may have any suitable cross-section shape, including but not limited to, those shown in FIG. 2E (shapes as follows: 142e, circular; 142f, square; 142g, hexagonal; 142h, triangular; 142i, trapezoidal; 142j, oval; 142k, teardrop; 142l, rectangular; 142m, teardrop; 142p, barrel).

Each pin end 136, 138 has an outer end bevel or taper 136a, 138a, respectively. Edge portions 146, 147 of the protective ring 140 are squeezed between an interior wall 126 of the coupling member 120 and the bevelled pin ends, thus assisting in securing the ring 140 in place adjacent the interior wall 126 of the coupling member 120.

It is within the scope of the present invention for all energizing members of a ring (any disclosed herein) according to the present invention to be of the same or of different hardness. As shown in FIG. 2A, the two energizing members 142a, 142c are of the same hardness and the energizing member 142b is of a material harder than the material of the energizing members 142a, 142c. In one particular aspect, the energizing members 142a, 142c are made of a resilient elastomeric material, e.g., but not limited to, nitrile or butile; in certain aspects the members 142a, 142c with a hardness of about 70 durometer and the member 142b with a hardness of about 90 durometer. Any ring according to the present invention may have energizing members located further interiorly than other energizing members of a hardness less than the other energizing members (e.g. other energizing members at an exterior wall of a ring).

In the coupling system 100, the protective ring 140 extends around the entire inner circumference of the coupling member 120 and the energizing members 142a, 142b, and 142c (and their corresponding openings 144a, 144b, 144c) extend around (and within) the entire circumference of the ring 140.

FIG. 3A shows a protective ring 200 according to the present invention (e.g. usable in the coupling systems of FIGS. 1A and 2A). In certain particular aspects a body 202 of the ring 200 is made of compressible anti-corrosive material, e.g. elastomeric resilient material, polytetrafluoroethylene ("PTFE"), or a combination of elastomer and PTFE. Initially three openings 211, 212, and 213 extend from an exterior of the ring 200 to interior spaces 221, 222, 223, respectively, within the ring 200. Energizing members 231, 232, 233 are located within the interior spaces 221, 222, 223, respectively.

Optionally, the ring 200 has outer edges or "teeth" 204, 205.

The openings 211, 212, 213, the spaces 221, 222, 223 and the energizing members 231, 232, 233 extend around the entire generally cylindrical body 202 (which is like the rings 40 and 140 in general hollow cylindrical shape although only part of the ring 200 is shown in FIG. 3A). Optionally, the body 202 has a circumferential indentation 206 or concave area therearound.

Figure 3B:
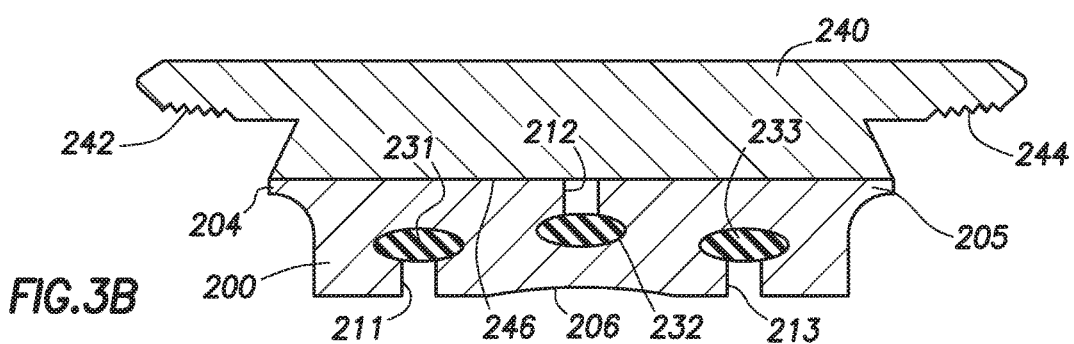
FIG. 3B is a partial side view in cross-section of the protective ring of FIG. 3A installed in a coupling member according to the present invention.
Figure 3C:
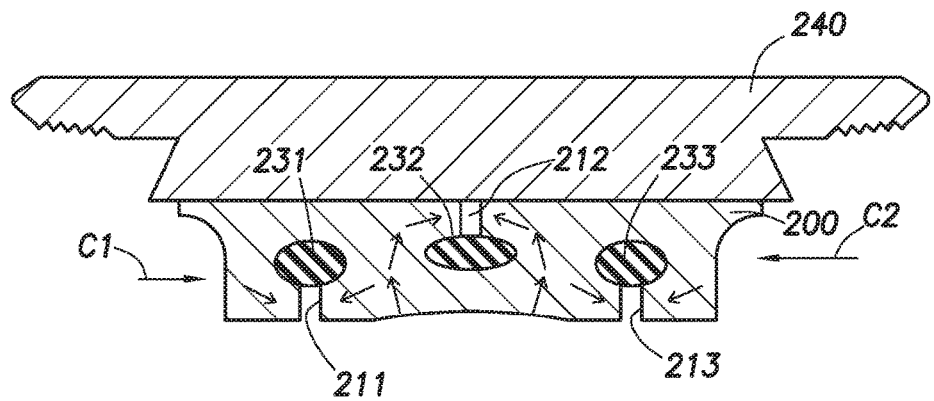
FIG. 3C is a partial side view in cross-section of the protective ring of FIG. 3A and the coupling member of FIG. 3B in initial compression.
Figure 3D:
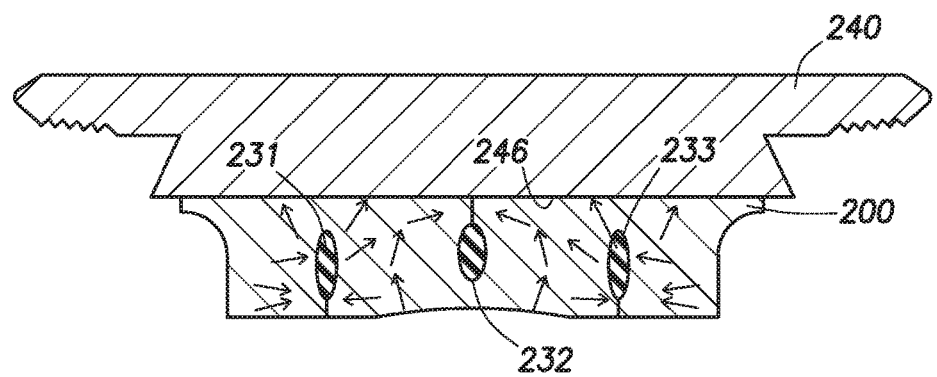
FIG. 3D is a partial side view in cross-section of the protective ring of FIG. 3A and the coupling member of FIG. 3B in further compression.
Figure 3E:
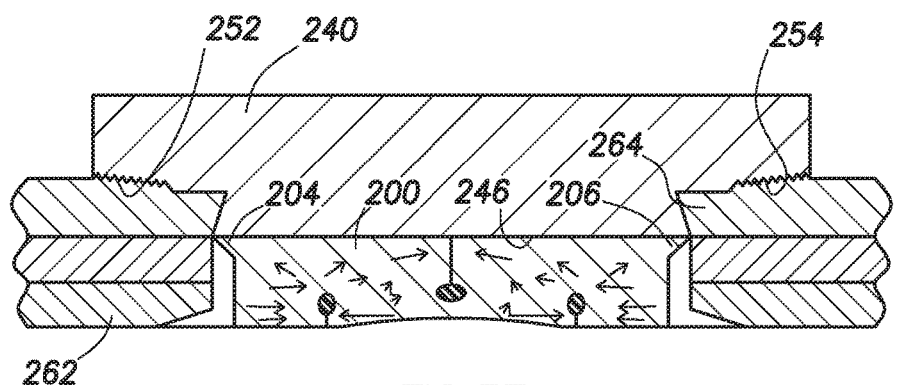
FIG. 3E is a partial side view in cross-section of the protective ring of FIG. 3A and the coupling member of FIG. 3B compressed while the coupling connects two tubulars.

As shown in FIG. 3B, the ring 200 is positioned adjacent and installed inside a coupling member 240 (shown partially-shaped generally cylindrically as the coupling members 20 and 120 described above) having internally threaded ends 242, 244 for threadedly mating with externally threaded ends (e.g. the ends 252, 254 of pipes 262, 264, FIG. 3E).

As shown in FIG. 3C the ring 200 is being compressed (indicated by arrows C1, C2), e.g. by pin ends of two tubulars to be connected together by the coupling 240. Since energizing members 231 and 233 are not as hard as the energizing member 232, the energizing members 231 and 233 move under compression before the energizing member 232, thus the ring 200 begins to move outwardly (toward the coupling member 240 as shown in FIG. 3C). The openings 211 and 213 begin to restrict and close. Then the opening 212 begins to restrict and close. The openings 211-213 provide space so that the ring 200 does not significantly expand into the flow path of the coupling member 240. The indentation 206 also facilitates the outward movement (toward the coupling member interior wall) of the ring 200 and provides an area or a void for ring material to flow to when the ring is compressing.

FIG. 3D illustrates the ring 200 fully compressed with the openings 211-213 closed and the energizing members 231-233 compressed (the members 231-233 have changed shape). The ring 200 has been forced against an interior wall 246 of the coupling member and, due to the openings 211-213, the indentation 206, and/or the entrapment of the two teeth 204,205, the ring 200 has been biased outwardly and prevented from bowing inwardly so that the ring 200 is pressed up against the interior wall 246 along the length of the ring 200. The energizing members 231-233 are pushing the ring 200 against the coupling's interior wall.

As shown in FIG. 3E, the edges or teeth 204, 205 of the ring 200 have been trapped between tapered ends of the tubulars 262, 264 and part of the interior wall 246 of the coupling member 240, thus facilitating maintenance of the ring 200 in position to protect the interior wall 246.

With no adhesive or material between the interior wall 246 and the ring 200, and with the edges 204, 205 entrapped as described, either: corrosive fluid and/or material does not come into contact with the wall 246; or once such fluid and/or material does move between the wall 246 and the exterior of the ring 200 it is held there and its escape therefrom is inhibited or prevented. Thus, the wall 246 is exposed only to that amount of the material (and, in certain aspects only to the amount of oxygen in that amount of material) so that other corrosive material is prevented from flowing into that space to corrode the wall 246 and so that a continuous flow of corrosive material is inhibited or prevented.

In certain aspects oil country tubular goods are made according to certain length tolerances, e.g. one-eighth inch plus or minus. By approximately sizing the openings (e.g. the openings 211-213) of a ring according to the present invention, this manufacturing tolerance can be accommodated. For example, for tubulars with a one-eighth inch manufacturing tolerance, if each opening (e.g. 211-213) is 0.66 inches for a total of about 0.200 inches (actually 0.198 inches) and the energizing members themselves (e.g. members 231-233) can be squeezed a total of another 0.050 inches, a total of about 0.250 inches of compression is available, i.e., an amount equal to about the manufacturing tolerance of one-eighth inch plus or minus (a total of one-fourth inch).

Figure 4A:
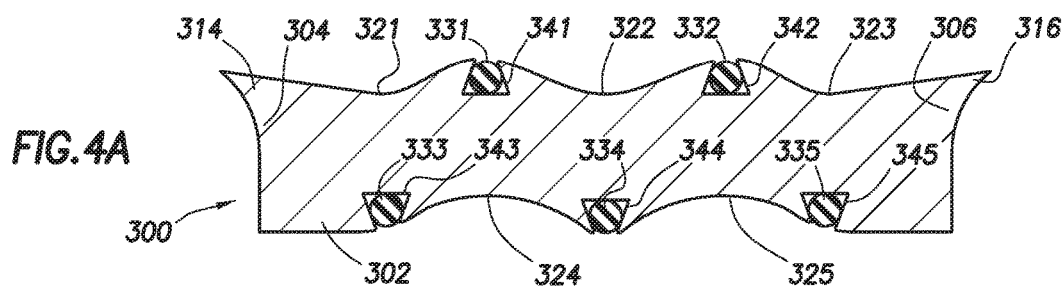
FIG. 4A is a side cross-section view of a generally cylindrical hollow ring (only one half shown) according to the present invention.

FIG. 4A shows a ring 300 according to the present invention useful in protecting a coupling member (e.g. a coupling member as in FIGS. 1A, 2A, 3B or 3E). The ring 300 (only half is shown) has a body 302 with a first end 304 and a second end 306. Each end, optionally, has a projecting edge or tooth 314, 316, respectively which extends around the entire circumference of its respective circular end. A plurality of concave areas extend around the ring's circumference areas 321, 322, 323 on the ring's exterior surface and areas 324, 325 on the ring's interior surface. Two energizing members 331, 332 or held in corresponding recess 341, 342 on the ring's exterior surface and three energizing members 333, 334, 335 are held in corresponding recesses 343, 344, 345 on the ring's interior surface.

Figure 4B:
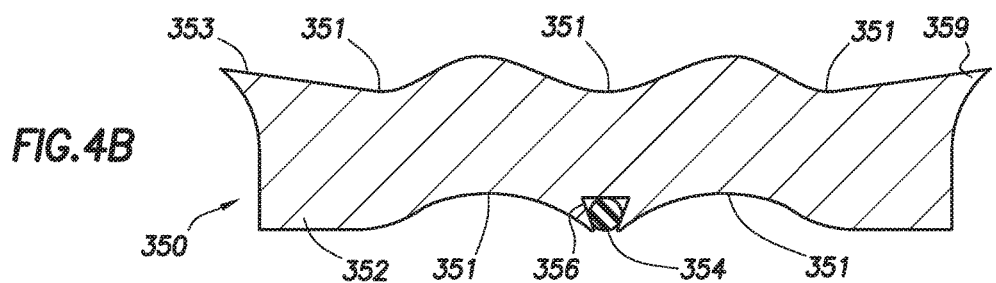
FIG. 4B is a side cross-section view of a generally cylindrical hollow ring (only one half shown) according to the present invention.
Figure 4C:
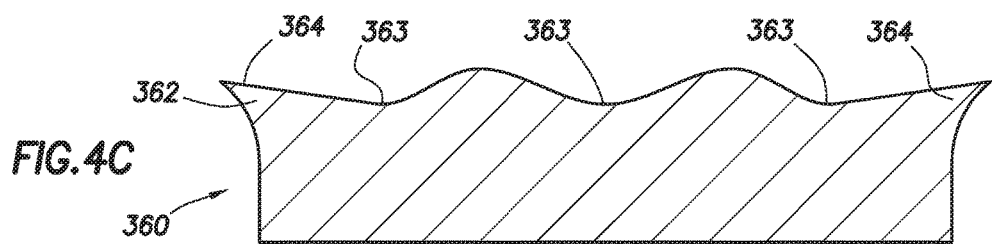
FIG. 4C is a side cross-section view of a generally cylindrical hollow ring (only one half shown) according to the present invention.
Figure 4D:
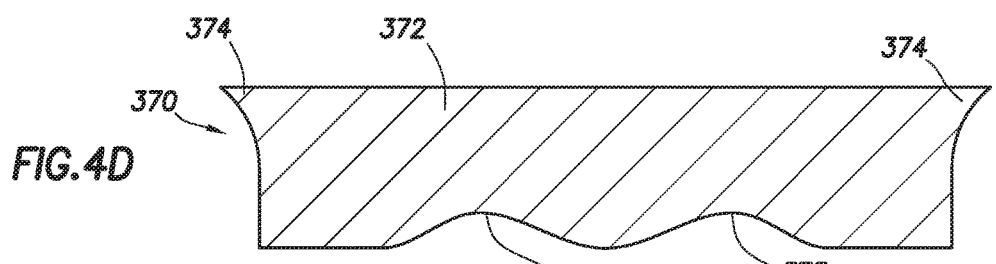
FIG. 4D is a side cross-section view of a generally cylindrical hollow ring (only one half shown) according to the present invention.
Figure 4E:
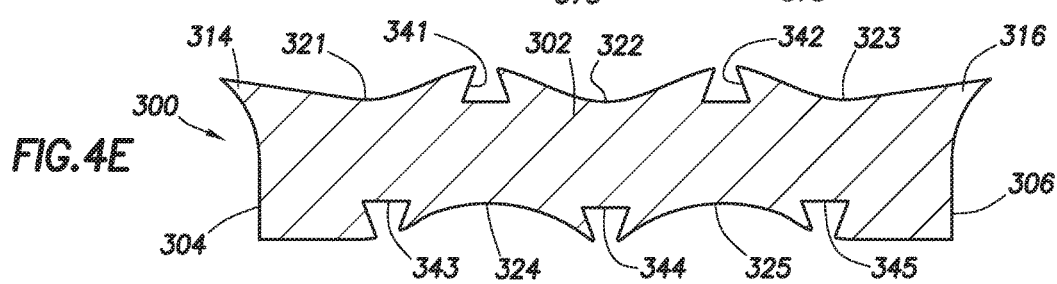
FIG. 4E is a side cross-section view of a generally cylindrical hollow ring (only one half shown) according to the present invention.

As shown in FIG. 4E, the energizing members are, in one aspect, deleted. Anyone, some, or all of the recesses 341-345 may be deleted.

The edges or teeth 314, 316 can be trapped as described above for the edges 204, 205.

As shown in FIG. 4A, each energizing member 333, 334, 335 can be located opposite a concave area 321,322,323 (along with other forces) respectively, and, upon energizing force the concave areas outwardly.

FIG. 4B illustrates a ring 350, like the ring 300, but with only one energizing member 354 on an interior surface of a ring body 352. The energizing member 354 is in a recess 356 which is positioned between two concave areas 351. These concave areas 351 are on the body's interior surface and the body 352 has two end edges or teeth 353,359.

FIG. 4C shows a ring 360, like the ring 350, but without the concave areas 351. A body 362 has three concave areas 363 on the body's exterior surface. Optionally, there are end edges 364 at ends of the body 362. Optionally, any energizing member or members disclosed herein can be added to the ring 360.

FIG. 4D shows a ring 370, like the ring 350, but without energizing members. A body 372 has two concave areas 373 on the body's interior surface. Optionally, ends of the body 372 have edges 374. Optionally, any energizing member or members disclosed herein can be added to the ring 370.

Figure 5A:
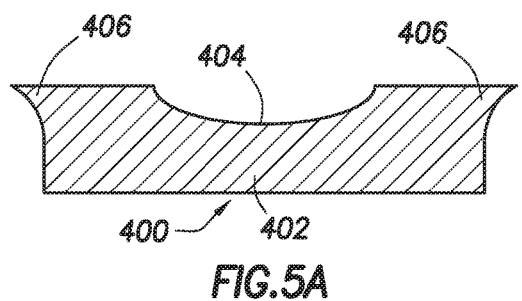
FIG. 5A is a side cross-section view of a generally cylindrical hollow ring (only one half shown) according to the present invention.

FIG. 5A shows a ring 400 according to the present invention which is a generally cylindrical hollow member (only half shown). The ring 400 has a body 402 with a concave area 404 on its exterior surface. As with all the concave areas referred to above, the concave area 404 extends around the body of the ring. Optionally, as is true of any ring according to the present invention, the concave area(s) may be intermittent, a single pocket, or a series of spaced-apart distinct pockets. Ends of the body 402, optionally, have edges 406.

Figure 5C:
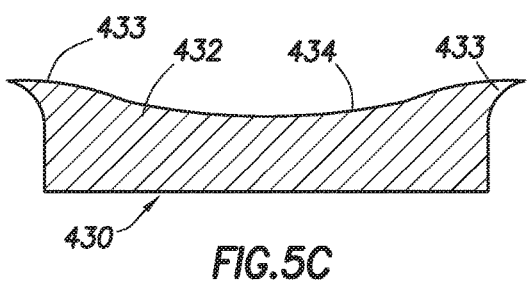
FIG. 5C is a side cross-section view of a generally cylindrical hollow ring (only one half shown) according to the present invention.
Figure 5B:
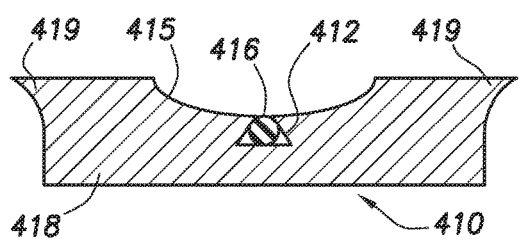
FIG. 5B is a side cross-section view of a generally cylindrical hollow ring (only one half shown) according to the present invention.

FIG. 5B shows a ring 410 according to the present invention which is like the ring 400 but which includes a recess 412 with an energizing member 416 therein. The ring 410 has a body 418 with a concave area 415 and with optional end edges 419.

FIG. 5C shows a ring 430 according to the present invention with a body 432 having optional end edges 433. A concave area 434 is on the body's exterior surface.

Figure 5D:
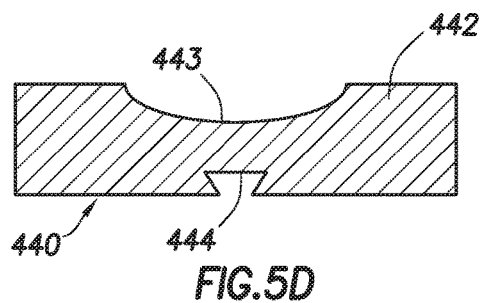
FIG. 5D is a side cross-section view of a generally cylindrical hollow ring (only one half shown) according to the present invention.

FIG. 5D shows a ring 440 according to the present invention with a body 442. The body 442 has a concave area 443 on its exterior and a recess 444 on its interior.

In any embodiment with intermittent concave areas, pocket, or pockets, if an energizing member is used, the energizing member may extend only so far as the area or pocket(s) or it may still extend uninterrupted around the ring's circumference.

Figure 6A:
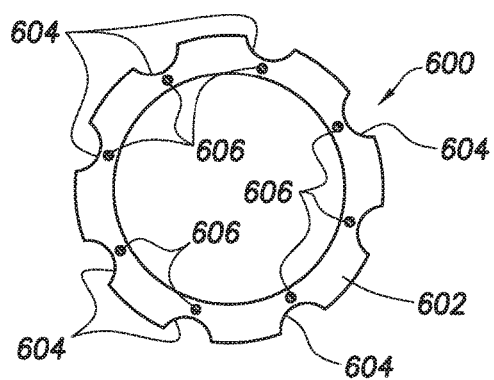
FIG. 6A is a top cross-section view of a ring according to the present invention.
Figure 6B:
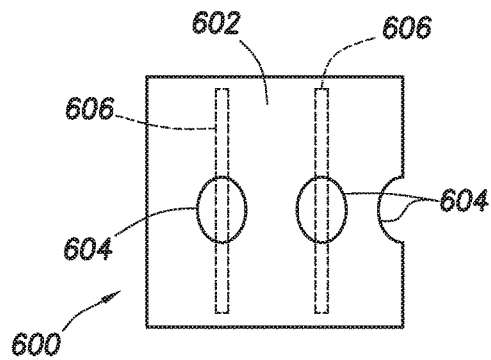
FIG. 6B is a side view of the ring of FIG. 6A.
Figure 6C:
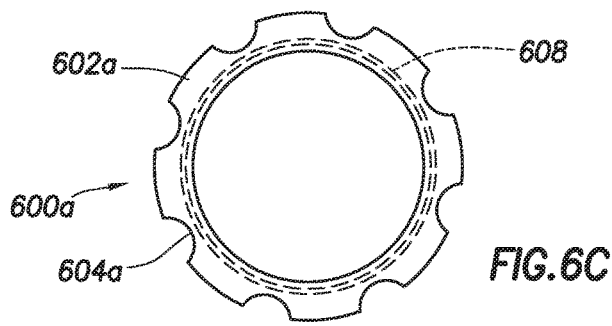
FIG. 6C is a top view of a ring according to the present invention.

FIG. 6A illustrates a ring 600 with a plurality of spaced-apart concave areas 604 in a body 602. optionally energizing members 606 are adjacent each pocket. Alternatively, as shown in FIG. 6C, in a ring 600a, like the ring 600, an energizing member 608 can extend adjacent all pockets 604a in a body 602a.

The present invention, therefore, provides in at least certain, but not necessarily all, embodiments, a ring, the ring having: a ring body positionable adjacent an interior wall of a coupling body of a coupling member between two spaced-apart ends of the coupling body and located for contact by two tubulars coupled together by the coupling member; the ring body being generally cylindrical and having a ring channel therethrough; the ring body having a volume; and at least one energizing member within the ring. Such a ring may have one or some, in any possible combination, of the following: at least one opening leading through the ring to the at least one energizing member; the at least one energizing member is a plurality of spaced-apart energizing members; the at least one opening is a plurality of openings, one opening corresponding to each of a plurality of energizing members; the plurality of openings is a first opening, a second opening, and a third opening and each of both the first opening and the third opening extend from an interior of the ring to a corresponding energizing member, and the second opening extends from an exterior of the ring to a corresponding energizing member; the two tubulars each have a tapered portion and the ring body has a first end and a second end, and two spaced-apart outer edges, one at the first end of the ring body and one at the second end of the ring body, and each outer edge trappable between an interior portion of the coupling member and a tapered portion of a tubular; the plurality of spaced-apart energizing members are a first energizing member and a second energizing member, and each of said energizing members has a hardness, and the hardness of the second energizing member is greater than the hardness of the first energizing member; the at least one energizing member is made of a resilient elastomeric material; the ring is made of compressible anti-corrosive material; the ring has a circumferential indentation therearound; the at least one opening is of sufficient size that the ring does not expand significantly into the ring channel upon installation within a coupling member and contact by two tubulars; the ring, upon compression, is movable against an interior wall of a coupling body of a coupling member by action of the at least one energizing member; and/or the at least one opening is sized for accommodating manufacturing length tolerances of the two tubulars.

The present invention, therefore, provides in at least certain, but not necessarily all, embodiments, a ring for use in a coupling member for coupling together two tubulars, the coupling member with a coupling body, the coupling body being generally cylindrical and having a channel therethrough, the coupling body with two spaced-apart ends, each end threaded for threaded mating with a tubular so that the coupling member is connectible to two tubulars, the coupling body having an interior wall, the ring including: a ring body positionable adjacent an interior wall of a coupling body of a coupling member between the two spaced-apart ends of the coupling body and located for contact by two tubulars by abutment by an end of each tubular, the ring body being generally cylindrical and having a ring channel therethrough, the ring body having a volume, a plurality of spaced-apart energizing members within the ring, the spaced-apart energizing members comprising at least a first energizing member and a second energizing member, and each of said energizing members having a hardness, a plurality of openings, one opening corresponding to each energizing member, each opening leading through the ring to an energizing member, the plurality of openings comprising at least a first opening and a second opening, the first opening extending from an interior of the ring to a corresponding energizing member, the second opening extending from an exterior of the ring to a corresponding energizing member, the hardness of the second energizing member greater than the hardness of the first energizing member, and wherein the ring, upon compression, is movable against the interior wall of the central portion of the coupling body by action of the energizing members.

The present invention, therefore, provides in at least certain, but not necessarily all, embodiments, a system for a coupling together two tubulars, the system including: a coupling member with a coupling body, the coupling body being generally cylindrical and having a channel therethrough, the coupling body with two spaced-apart ends, each end threaded for threaded mating with a tubular so that the coupling member is connectible to two tubulars, the coupling body having an interior wall; a ring body positioned adjacent the interior wall of the coupling body between the two spaced-apart ends of the coupling body and located for contact by the two tubulars by abutment by an end of each tubular, the ring being generally cylindrical and having a ring channel therethrough, the ring having a volume, and at least one energizing member within the ring.

The present invention, therefore, provides in at least certain, but not necessarily all, embodiments, a ring for use in a coupling member for coupling together two tubulars, the coupling member with a coupling body, the coupling body being generally cylindrical and having a channel therethrough, the coupling body with two spaced-apart ends, each end threaded for threaded mating with a tubular so that the coupling member is connectible to two tubulars, the coupling body having an interior wall, the ring including: a ring body positionable adjacent an interior wall of a coupling body of a coupling member between the two spaced-apart ends of the coupling body and located for contact by an end of each of two tubulars, the ring body being generally cylindrical and having a ring channel therethrough, the ring body having a circumference, the ring body having a volume, and at least one concave area on a surface of the ring. Such a ring may have one or some, in any possible combination, of the following: the at least one concave area extends around the ring's circumference; one or a plurality of spaced-apart energizing members in the ring; the or each energizing member extending around the ring's circumference; the at least one concave area is a plurality of spaced-apart concave areas; each of the plurality of spaced-apart concave areas extends around the ring's circumference; and/or the ring has an exterior and an interior, at least one concave area on the ring's exterior, and at least one concave area on the ring's interior; the at least one concave area on the ring's exterior is three spaced-apart areas, and the at least one concave area on the ring's interior is two spaced-apart areas; a plurality of energizing members in the ring, the three spaced-apart areas on the ring's exterior comprising a first area, a second area, and a third area, a first energizing member of the plurality of energizing members located between the first area and the second area, a second energizing member of the plurality of energizing members located between the second area and the third area, the two spaced-apart areas on the ring's interior comprising a fourth area and a fifth area, a third energizing member of the plurality of energizing members located between the fourth area and the fifth area, the ring having a first end and a second end, a fourth energizing member of the plurality of energizing members located between the first end and the fourth area, and a fifth energizing member of the plurality of energizing members located between the second end and the fifth area.

The present invention, therefore, provides in at least certain, but not necessarily all, embodiments, a system for coupling together two tubulars, the system including: a coupling member with a coupling body, the coupling body being generally cylindrical and having a channel therethrough, the coupling body with two spaced-apart ends, each end threaded for threaded mating with a tubular so that the coupling member is connectible to two tubulars, the coupling body having an interior wall; a ring positioned adjacent the interior wall of the central portion of the coupling body between the two spaced-apart ends of the coupling body and located for contact by an end of each of the two tubulars, the ring being generally cylindrical and having a ring channel therethrough, the ring having a circumference, the ring having a volume; and at least one concave area on a surface of the ring.

The present invention, therefore, provides in at least certain, but not necessarily all, embodiments, a method for coupling together two tubulars comprising a first tubular and a second tubular, the first tubular having an end with exterior threading, the second tubular having an end with exterior threading, the method including: threadedly engaging each threaded end of the each of the two tubulars with an end of two spaced-apart ends of a coupling system, the coupling system is any disclosed herein; a ring positioned adjacent the interior wall of the central portion of the coupling body between the two spaced-apart ends of the coupling body and located for contact by the two tubulars by abutment by an end of each tubular, the ring being generally cylindrical and having a ring channel therethrough, the ring having a volume, at least one energizing member within the ring, an end of each tubular contacting the ring and compressing the ring, and said compression energizing the at least one energizing member to move the ring against an interior wall of the coupling. Such a method may include one or some, in any possible combination, of the following: the at least one energizing member is a plurality of spaced-apart energizing members, the at least one opening is a plurality of openings, one opening corresponding to each energizing member, at least one opening extends from an interior of the ring to a corresponding energizing member, and at least one opening extends from an exterior of the ring to a corresponding energizing member; the ring has two spaced-apart outer edges, one at the first end of the ring and one at the second end of the ring, and each outer edge trappable between an interior portion of the coupling member and tapered portions of the two tubulars, the method including trapping each outer edge between the interior portion of the coupling member and a tapered portion of one of the two tubulars; the plurality of spaced-apart energizing members comprise at least a first energizing member and a second energizing member, and each of said energizing members having a hardness, the hardness of the second energizing member greater than the hardness of the first energizing member, the method including initiating energizing of the first energizing member before initiating energizing of the second energizing member; the at least one opening is of sufficient size that the ring does not expand significantly into the ring channel upon installation within the coupling member and contact by the two tubulars, the method including expanding the ring so that an insignificant amount of the ring expands into the ring channel; and/or the at least one opening is sized for accommodating manufacturing length tolerances of the two tubulars, the method including accommodating the manufacturing length tolerances with the at least one opening.

Accordingly, while preferred embodiments of this invention have been shown and described, many variations, modifications and/or changes of the system, apparatus and methods of the present invention, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. Thus, all matter herein set forth or shown in the accompanying drawings should be interpreted as illustrative and not limiting, and the scope of the invention and the appended claims is not limited to the embodiments described and shown herein.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. .sctn.102 and satisfies the conditions for patentability in .sctn.102. The invention claimed herein is not obvious in accordance with 35 U.S.C. .sctn.103 and satisfies the conditions for patentability in .sctn.103. This specification and the claims that follow are in accordance with all of the requirements of 35 U.S.C. .sctn.112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes.

What is claimed is:

1. A ring for use in a coupling member having a cylindrical interior wall between two threaded ends, the threaded ends for receiving and threadably coupling to tubular members:

a generally cylindrical body having in inner surface and an outer surface;

a plurality of circumferentially disposed concave surfaces in the outer surface;

a plurality of circumferentially disposed recesses in the outer surface, wherein one of the circumferentially disposed recesses in the outer surface is disposed between adjacent outer concave surfaces;

an energizing member disposed in each of the outer recesses, wherein the outer energizing member is exposed by an opening in the outer recess;

a plurality of circumferentially disposed concave surfaces in the inner surface;

a plurality of circumferentially disposed recesses in the inner surface, wherein one of the circumferentially disposed recesses in the inner surface is disposed between adjacent inner concave surfaces;

an energizing member disposed in each of the inner recesses, wherein the inner energizing member is exposed by an opening in the inner recess;

wherein each outer recess and each outer energizing member are disposed radially opposite one of the inner concave surfaces;

wherein each inner recess and each inner energizing member are disposed radially opposite one of the outer concave surfaces;

wherein, when axially compressed by opposing tubular members threaded into the two threaded ends, the energizing members, the concave surfaces, and the recess openings bias the ring radially outward whereby the outer surface is pressed against the interior wall.

2. The ring of claim 1, wherein the openings retain the energizing members in the recesses prior to axial compression.

3. The ring of claim 2, wherein the openings are closed about the energizing members upon axial compression.

4. The ring of claim 1, further comprising circumferential projecting edges at each end of the ring.

5. The ring of claim 4, wherein, upon axial compression by the opposing tubular members threaded into the two threaded ends, the circumferential projecting edges are trapped between the tubular members and the interior wall to supplement the radially outward ring bias.

6. A ring for use in a coupling member having a cylindrical interior wall between two threaded ends, the threaded ends for receiving and threadably coupling to tubular members:
 a generally cylindrical body having in inner surface and an outer surface;
 a plurality of circumferentially disposed concave surfaces in the outer surface;
 a recess circumferentially disposed in the outer surface between adjacent outer concave surfaces, the recess including an opening to receive and retain an energizing member in the recess;
 a plurality of circumferentially disposed concave surfaces in the inner surface;
 a recess circumferentially disposed in the inner surface between adjacent inner concave surfaces, the recess including an opening to receive and retain an energizing member in the recess;
 wherein the outer recess and the retained outer energizing member are disposed directly radially outward from one of the inner concave surfaces;
 wherein the inner recess and the retained inner energizing member are disposed directly radially inward from one of the outer concave surfaces;
 wherein, when axially compressed by opposing tubular members threaded into the two threaded ends, the energizing members, the concave surfaces, and the recess openings bias the ring radially outward whereby the outer surface is pressed against the interior wall.

7. The ring of claim 6 further comprising:
 a second outer recess and second retained outer energizing member disposed directly radially outward from a second of the inner concave surfaces;
 a second inner recess and second retained inner energizing member disposed directly radially inward from a second of the outer concave surfaces; and
 a third inner recess and third retained inner energizing member disposed directly radially inward from a third of the outer concave surfaces.

8. A ring for use in a coupling member having a cylindrical interior wall between two threaded ends, the threaded ends for receiving and threadably coupling to tubular members:
 a generally cylindrical body having in inner surface, an outer surface, and a longitudinal axis;
 a plurality of circumferentially disposed concave surfaces in the inner and outer surfaces, wherein the concave surfaces alternate between inner and outer concave surfaces along the longitudinal axis of the cylindrical body;
 a plurality of circumferentially disposed recesses in the inner and outer surfaces, wherein the recesses alternate between inner and outer recesses along the longitudinal axis of the cylindrical body and are disposed between adjacent concave surfaces; and
 a plurality of energizing members, at least one energizing member disposed through an opening of each recess and retained in the recess;
 wherein, when axially compressed by opposing tubular members threaded into the two threaded ends, the energizing members, the concave surfaces, and the recess openings bias the ring radially outward whereby the outer surface is pressed against the interior wall.

9. The ring of claim 8 wherein the concave surfaces and the recesses alternate such that each outer recess with the retained energizing member is disposed, in a radial direction from the longitudinal axis, opposite one of the inner concave surfaces, and each inner recess with the retained energizing member is disposed, in the radial direction, opposite one of the outer concave surfaces.

* * * * *